Feb. 13, 1940.　　　　G. SUNDBACK　　　　2,190,628

METHOD OF MAKING SLIDE FASTENER STRINGERS

Filed June 15, 1938

INVENTOR.
Gideon Sundback
BY Kelley & Chisholm
ATTORNEYS.

Patented Feb. 13, 1940

2,190,628

UNITED STATES PATENT OFFICE 2,190,628

METHOD OF MAKING SLIDE FASTENER STRINGERS

Gideon Sundback, Meadville, Pa., assignor to Talon, Inc., Meadville, Pa., a corporation of Pennsylvania Application June 15, 1938, Serial No. 213,847

3 Claims. (Cl. 154—2)

My invention relates to the art of making slide fastener stringers and it aims to provide an improved process for the production of plastic fasteners tending toward economy and simplicity in the manufacturing operations.

In the manufacture of slide fastener stringers from plastic materials, a wide variety of materials are required. Heretofore this requirement has necessitated the carrying of a large stock of plastic materials in the fastener factory in order that materials will be available of the desired color. This has greatly added to the cost of manufacturing operations as a whole and furthermore, the carrying of such stocks of plastic material, especially cellulose nitrate, is a serious fire hazard. The difficulty of using a transparent or clear material for the stock and then later dyeing it with a desired color is that the dipping process after the fastener elements are applied to the stringer will disturb the color surfaces and produce an uneven effect. According to my invention I propose to carry stocks of formed fastener member strips wherein the exterior surfaces are for the most part exposed, which strips can be dyed prior to cutting apart and assembled with the tape, to any desired color, or they may be merely dipped in a solvent for smoothing the exterior surfaces. Then the strip is cut apart and the interlocking elements are assembled with the tape in the desired spaced relation where they are held temporarily by friction. Thereupon the tape and interlocking element assembly are subjected to a solvent action which may be termed "wicking", that is, the tape is allowed to depend in the solvent bath with the fastener elements projecting above the surface of the bath. The solvent passes by capillary action through the tape to the inside surfaces of the slots in the fastener elements causing them to become stuck to the tape.

In the accompanying drawing, I have shown for purposes of illustration one embodiment which my invention may assume in practice. In the drawing.

Figure 1:
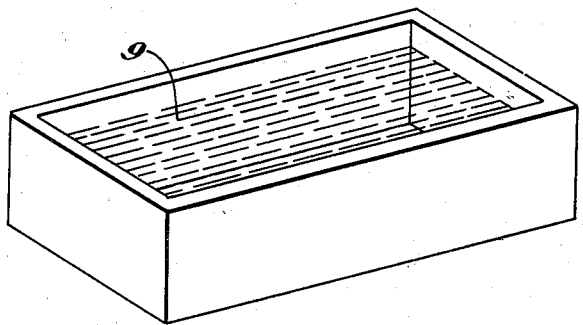
Fig. 1 shows schematically a dip bath for the interlocking element strips.
Figure 2:
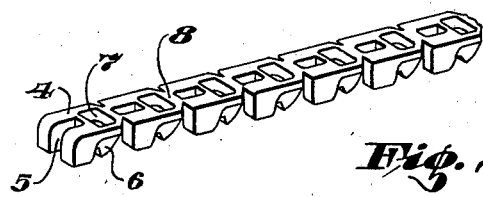
Fig. 2 shows a typical interlocking element strip.
Figure 3:
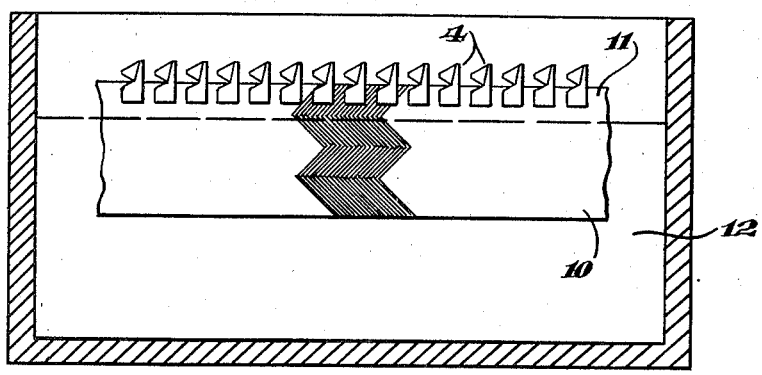
Fig. 3 shows schematically the wicking step.

The fastener element strip comprises a plurality of interlocking elements 4 of a familiar construction joined in end to end relation. Each element has a slot 5 at one end which is adapted to receive the tape, and an interlocking head at the other end comprising a projection 6 on one side and a recess 7 on the other side. A strip of the desired cross-sectional shape having been provided by extrusion or other means, is subjected to milling operations for forming the surfaces on the fastener elements, also the portions 8 of greatly reduced cross-section which join the head of one element to the slot end of the other element. The slots 5 may be formed either before or after the dipping step. Strips preferably at the stage shown in Fig. 2 are dipped in a bath 9 which has a solvent of the material and which in most instances, carries a dye to give the desired color characteristics to the exterior surface of the interlocking elements. At the same time, the solvent action will smooth up the sharp corners and rough edges on the interlocking elements. The material of the strip can be of any soluble plastic substance, cellulose nitrate such as "Pyralin" and various cellulose acetate materials having been found most suitable up to the present time.

After dipping and coloring the strips are then stored for a limited time to allow them to dry. If the slots 5 have not been formed in the strips previous to the dipping step (which is optional as described above), the strips are slotted after the drying operation has been completed. After the slotting and drying operations have been completed the strips are ready to be fed to the assembly machine. This machine successively cuts the interlocking elements from the strip and places them in the desired position on the edge of a fabric tape 10. The margin 11 of this tape has a thickness at least as great and preferably a little greater than the width of the slots 5 so that the elements are held temporarily in place by frictional contact. The assembly then receives the wicking treatment. For this purpose a solvent bath 12 is provided and the tape is allowed to depend into the solvent up to closely adjacent the interlocking elements 4. The solvent moves by capillary action through the tape until the entire tape becomes wet and the inside surfaces of the slot 5 are moistened sufficiently to cause them to adhere firmly to the tape. Upon removing the assembly from the bath and after a suitable drying period evaporating the solvent, the elements on the fastener stringer are completed. In this manner, the exterior surfaces of the fastener elements which have been given the desired surface characteristics are not disturbed. This is especially important when the dyeing treatment is used but it also has considerable advantages even when the strip is not to be dyed. For example, the time interval for giving the desired smoothing effect may be less in many cases, than is necessary for giving the desired sticking effect. According to my invention the two processes can be carried on separately and the time of each process can be varied as found necessary.

While I have shown and described in this application one embodiment which my invention may assume in practice, it will be understood that this embodiment is for the purposes of illustration and that various other forms may be devised within the scope of my invention as set forth in the appended claims. What I claim as my invention is:

1. In the manufacture of slide fastener stringers, forming interlocking elements from soluble plastic material, treating the exterior surfaces thereof with a solvent bath, then applying said elements to a tape stringer in the desired spaced relation, and thereafter dipping that portion of the tape which projects beyond the fastener elements in a solvent bath for causing the solvent to move by capillary action to the tape contacting surfaces of the interlocking elements whereby the material of the surfaces are softened to cause them to stick to the tape when the solvent is evaporated, and then evaporating the solvent.

2. In the manufacture of slide fastener stringers, the process defined in claim 1 wherein said solvent bath includes a dyeing agent which colors the exterior surfaces of the fastener elements.

3. In the manufacture of slide fastener stringers, forming a continuous strip of interlocking elements, disposed in end to end relationship and connected by portions of reduced section by milling a blank strip, dipping the milled strip in a pigmented solvent for the strip material to simultaneously smooth and color the surfaces thereof, severing the strip at said portions of reduced section to produce finished interlocking members, then setting the finished interlocking members on a flexible supporting tape having capillary properties, and dipping a portion only of the flexible support in a solvent for the strip material to supply solvent by capillary action to the area of contact of the interlocking members with the flexible support to bond the members to the supporting tape by solution of the strip material and to prevent running of the color into the strip material.

GIDEON SUNDBACK.